Figure 1:
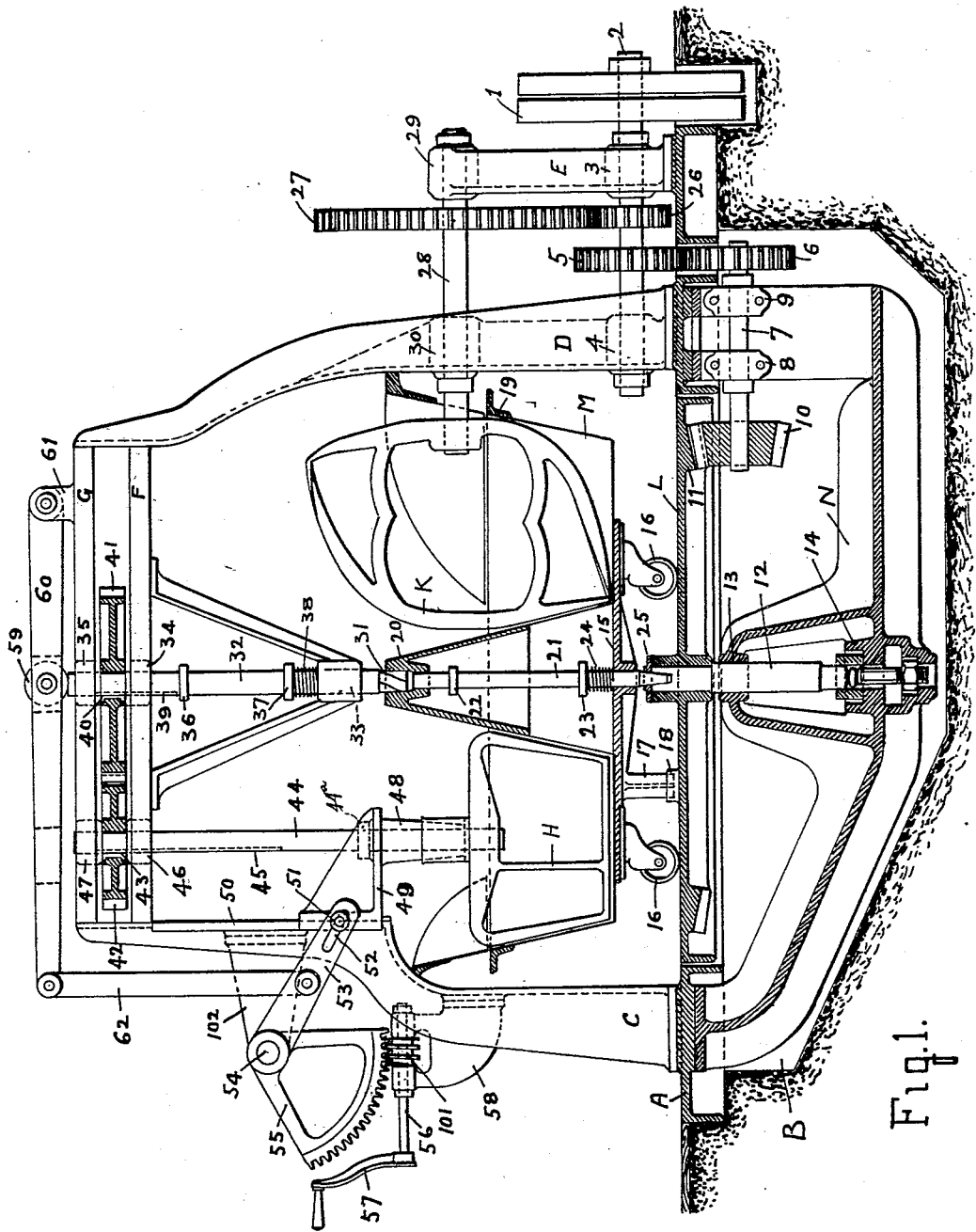

(No Model.)  3 Sheets—Sheet 1.

L. DURAND.
DOUGH KNEADING MACHINE.

No. 562,952.  Patented June 30, 1896.

WITNESSES:
H. L. Leverett.
J. Green.

INVENTOR
Louis Durand
BY
ATTORNEYS

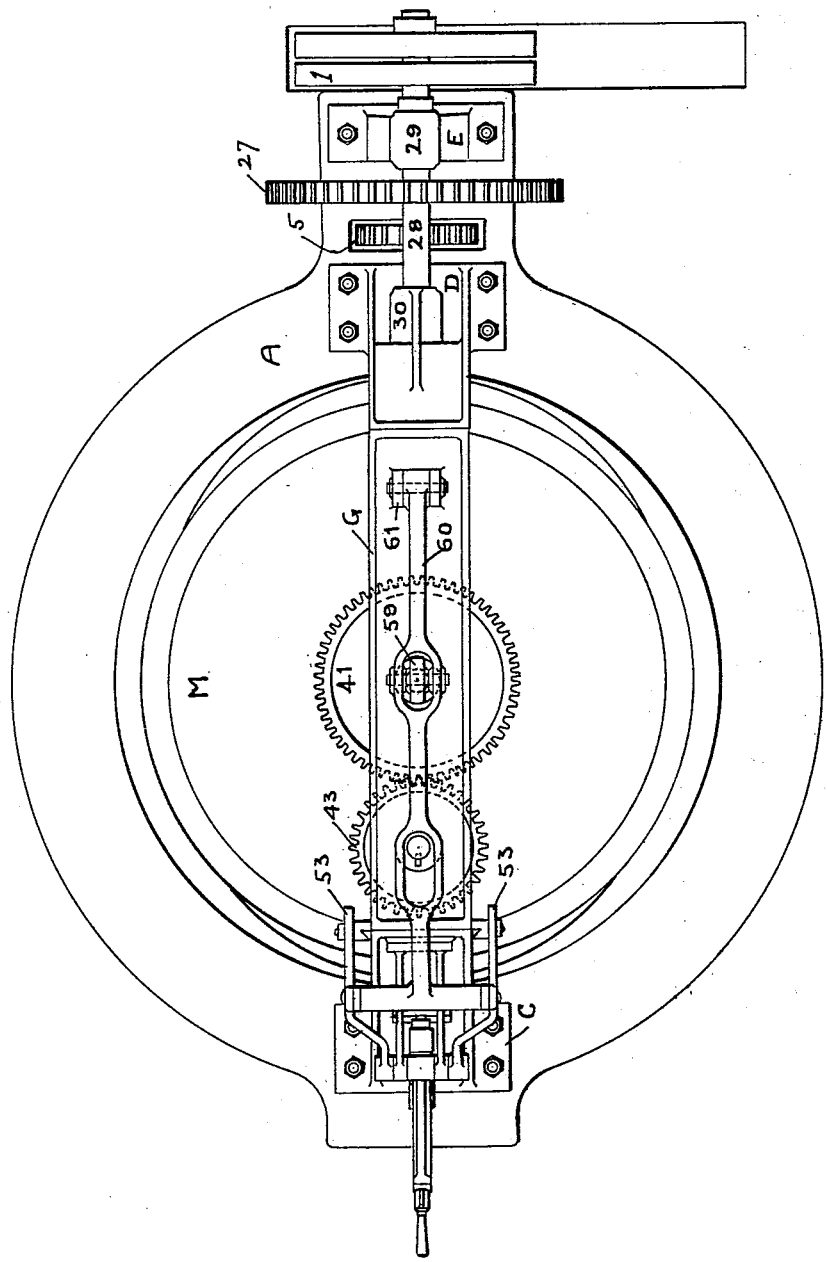

(No Model.) 3 Sheets—Sheet 3.
L. DURAND.
DOUGH KNEADING MACHINE.
No. 562,952. Patented June 30, 1896.
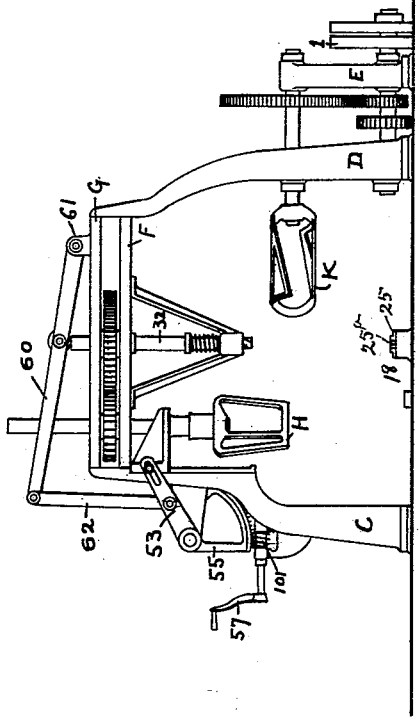
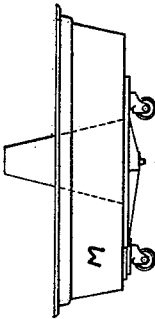
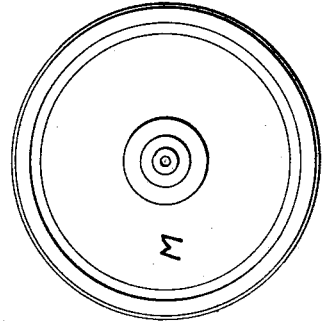
WITNESSES:
H. L. Leverett.
J. Green.
INVENTOR
Louis Durand
BY
Knight Bros
ATTORNEYS

UNITED STATES PATENT OFFICE.

LOUIS DURAND, OF NEW YORK, N. Y.

DOUGH-KNEADING MACHINE.

SPECIFICATION forming part of Letters Patent No. 562,952, dated June 30, 1896.

Application filed August 17, 1895. Serial No. 559,608. (No model.)

*To all whom it may concern:*

Be it known that I, LOUIS DURAND, a citizen of the United States, residing at New York, in the county and State of New York, have invented certain new and useful Improvements in Dough-Kneading Machines, of which the following is a specification.

My present invention relates to improvements in dough-kneading machines of the large class.

I provide a rotatable platform or table driven from beneath and a removable pan which is adapted to be centered upon the rotary platform and attached thereto by suitable means, so as to rotate with it. To facilitate or permit the removal of the pan from the platform, I provide a means for elevating and lowering the vertically-journaled stirrer, and support the horizontal kneader in a journal above the edge of the pan. By these means I am enabled to elevate one of the stirrers entirely out of the pan and turn the other into horizontal position above the edge of the pan, so that there will be no interference to the removal of the pan. The vertically-journaled stirrer is preferably operated from a shaft which receives motion from the pan, said shaft being vertically movable and held out of engagement with the pan by a spring and forced and held into engagement by suitable means, preferably a lever having an antifriction device for engaging with the end of the shaft. The centering device for centering the pan upon the rotatable platform consists, preferably, of a vertically-movable pin or rod held out of engagement, with a recess in the platform or its supporting-shaft, by means of a spring, and forced into such engagement by means of the longitudinally-movable shaft which drives the stirrer. For elevating the vertically-journaled stirrer out of the pan and lowering it into the pan I preferably provide a bracket slidingly mounted upon a suitable standard and operated by a rock-arm keyed to a rock-shaft, which also has a toothed segment keyed to it and is moved by a worm-gear meshing therewith. A lever for controlling the longitudinally-movable shaft is preferably connected with the stirrer-elevating bracket by means of a suitable arm. All of the operating parts of the machine are driven from a single power-shaft.

In order that my invention may be fully understood, I will first describe the same with reference to the accompanying drawings and afterward point out the novelty with more particularity in the accompanying claims.

In said drawings, Figure 1 is a vertical sectional elevation of my improved machine. Fig. 2 is a plan view of the same. Fig. 3 is a plan view of the removable pan. Fig. 4 is a side elevation of the improved machine, on a smaller scale, showing the parts in position to allow the removal of the pan, the pan being omitted. Fig. 5 is a side elevation of the removable pan.

A is a suitable circular base-plate or supporting-frame arranged around the edge of a pit B. The base-plate A is on a level with the floor.

C, D, and E are standards extending up from the base-plate to support the operating parts of the machine.

F and G are cross frames or girders securing the standards C and D together at top.

H is the vertically-journaled stirrer, and K is the horizontally-journaled kneader or stirrer.

L is a revolving platform upon which the pan M is carried.

N is a frame or girder extending beneath the platform and having formed with it the step-bearing 14, which supports the lower end of the vertical shaft 12, which extends beneath and is keyed to the rotary platform L for supporting it. The shaft 12 is supported just beneath the platform in the bearing 13, which is formed integral with the girder-frame N.

The machinery receives motion from a pulley 1, which is keyed to the shaft 2, revolving in bearings 3 and 4 of the standards D and E.

5 is a gear-wheel also keyed to the shaft 3 and meshing with a small gear-wheel 6, keyed to the outer end of a short shaft 7, which is journaled in the bearings 8 and 9.

10 is a bevel-gear keyed to the inner end of the short shaft 7, which meshes with an annular bevel-gear 11, secured to or formed integral with the under side of the rotary platform L.

The pan M is provided with an under frame or carriage 15, provided with supporting caster-rollers 16, which enable the pan with the dough to be transferred from place to place. Extending beneath the frame 15 is a lug 17, which is adapted to engage with a smaller lug 18, projecting up from the rotary platform L, by means of which the pan is caused to rotate with the platform. The pan is provided with an annular rim 19 and an inner hub or casting 20.

For centering the pan upon the rotary platform L, I provide a vertically-movable pin or rod 21, which is supported in suitable journal-openings in the hub 20 and under frame 15 and is provided with fixed collars or flanges 22 and 23, the former of which limits the upward movement of the pin by coming in contact with the hub 20, while the latter confines the spiral spring 24 between it and the under frame 15 for giving the pan a normally upward tendency. In the upper end of the shaft 12 or the center hub of the platform L is formed a tapering flared hole or recess in which engages the lower squared end of the pin 21 when it is forced downwardly against the action of the spring 24. This serves to center the pan upon the platform and will assist the lugs 17 and 18 in carrying the pan around with the platform.

A plate, such as 25, can be secured above the hub of the platform L with an opening $25^a$ in one side for guiding the projecting end of pin 21 into engagement with the central recess in shaft 12 when the pan is rolled into position on the platform.

26 is another gear-wheel keyed to the driving-shaft 2 to one side of the gear-wheel 5 and meshing with a large gear-wheel 27, which is keyed to the horizontal shaft 28, which supports the kneader K. The shaft 29 is journaled in bearings 29 and 30 in the standards D and E.

Supported centrally above the hub 20 of the pan M in the bearings 33, 34, and 35 is a longitudinally-movable rotary shaft 32, which is formed with a twisted squared lowered end 31, which is adapted to engage in the squared socket formed in the hub 20, and also to project against the upper end of pin 21 and force it down into engagement with the recess in shaft 12. The shaft 32 is formed with integral collars 36 and 37, the upper one of which serves to confine the upward movement of the shaft by engaging with the bearing 34, while the lower one confines the spiral spring 38 between it and the bearing 33, said spring tending to hold the shaft 32 in elevated position. The shaft 32 is formed with a feather 39, which engages in a corresponding groove formed in the hub of the gear 41 for splining the shaft to the gear and allowing the shaft to move vertically through the gear. The gear 41 meshes with a smaller gear 42, journaled between the cross-bars F and G, and formed with a small groove 43 in its hub, with which engages a feather 45 on the vertically-movable rotary shaft 44, supporting at its lower end the vertical stirrer H. The shaft 44 is journaled adjacent to its upper end in the bearings 46 and 47, and above the stirrer H the shaft 44 is provided with a collar $44^a$. (Shown in dotted lines.)

49 is a sliding bracket having suitable guiding-flanges which fit over the flanged guideway 50, formed on the standard 3. The bracket 49 is provided with a bearing 48, which surrounds the shaft 44 beneath the collar $44^a$ in such a manner as to allow the shaft 44 and its stirrer to rotate freely, and to cause them to be elevated out of or lowered into the pan when the bracket 49 is moved on its guideway.

54 is a rock-shaft journaled in a suitable bracket 102, and 53 is a rock-arm keyed to said shaft and formed with a slot 52 at its forward end which engages a pin 51 of the bracket 49 in such a manner that the movement of the arm 53 on its shaft 54 will cause the bracket 49 to slide vertically on its guideway.

55 is a toothed segment also keyed to the shaft 54 and meshing with a worm-gear 101, mounted on the shaft 56, which is operated by a rotary hand-lever 57. The shaft 56 is journaled in a bracket 58, extending out from the standard C. By the rotation of the crank 57 the bracket 49, carrying with it the stirrer H, can be moved vertically.

60 is a lever pivoted at one end in a bracket 61, secured to the cross-bar G and provided with an antifriction-roller or other similar device 59, which is adapted to engage with the upper end of the shaft 32 and force it downwardly into engagement with the hub 20 of pan M against the action of spring 38. The lever 60 is connected at its forward end through the rod 62 with the rock-arm 53 in order that it may be operated at the same time with the sliding bracket 49. By this means the rotation of the vertically-journaled stirrer H can be stopped at the same time that it is elevated from the pan.

When it is desired to remove the pan of dough, which has been thoroughly kneaded by my improved machine, in a manner which will be well understood by those skilled in the art, the vertical kneader or stirrer H is elevated from the pan by the means already described, and the horizontal kneader K is rotated to horizontal position. The elevation of the stirrer H also releases the shaft 32 from its engagement with the hub of the pan M, and this in turn releases the pin 21 from engagement with the recess in shaft 12. These parts being disengaged the pan can be rolled off of the platform and another pan of dough quickly rolled into place, when the operation can be continued by simply lowering the stirrer H into position and connecting up the shaft 32 and pin 21 by simply rotating the crank 57.

If it is desired, the bread can be allowed to rise in the pan M.

It will not be necessary to give a more detailed account of the operation of the machine, as it will be clearly understood from the above.

Having thus described my invention, what I claim, and desire to secure by Letters Patent, is—

1. In a dough-kneader, the combination of a rotatable platform or support, means for rotating it, a removable pan adapted to rest on the platform, means of engagement between the pan and platform, a stationary upright frame or support overhanging or projecting over the pan and platform, a vertically-movable rotatable kneader or stirrer working in the pan and journaled and slidingly supported in said upright or support, and means for lowering the kneader or stirrer into or elevating it out of the pan, substantially as and for the purpose set forth.

2. In a dough-kneader, the combination of a rotary platform, a pan removably attached to said platform and adapted to rotate with it, a stationary frame or support extending above the platform, a vertically-movable rotatable shaft journaled in said frame or support centrally over the pan and adapted to engage it at its lower end, a spring for holding the shaft in raised position, a lever bearing upon the upper end of the shaft and adapted to hold it down into engagement with the pan, a vertically-movable rotary kneader or stirrer, and gearing between the shaft and said kneader or stirrer, substantially as set forth.

3. In a dough-kneader, the combination of a rotary platform mounted on a shaft extending vertically beneath it, a recess in the upper end of the shaft, a pan removably attached to the platform and adapted to rotate with it, a vertically-movable pin or rod supported centrally in the pan and adapted to project into the recess in upper end of platform-shaft, a spring for holding the pin or rod in disengaged position, a vertically-movable rotary shaft journaled above the pan in line with its axis, means for holding said shaft in elevated position, means for holding it down into engagement with the end of the pin or rod and with the pan, a kneader or stirrer, and gearing between the vertically-movable shaft and the kneader or stirrer, substantially as set forth.

4. In a dough-kneader, the combination of a rotary platform mounted on a vertical shaft, a recess in the upper projecting end of shaft, a removable pan on said shaft, a spring-supported pin carried by the pan, means for forcing the pin down into engagement with the recess in the shaft, and a suitably-operated stirrer, substantially as set forth.

5. In a dough-kneader, the combination of a pan, an upright support or framework, a vertically-movable rotatable stirrer journaled in the support and operating in said pan, a vertically-sliding bracket mounted on the support and engaging the stirrer, and means for elevating the bracket carrying the stirrer, substantially as set forth.

6. In a dough-kneader, the combination of a pan, a vertically-movable rotary stirrer or kneader working in said pan, a sliding bracket engaging said stirrer, a rock-arm engaging said bracket, and means for operating the rock-arm for elevating and lowering the stirrer, substantially as set forth.

7. In a dough-kneader, the combination of a pan, a stirrer mounted upon a rotary vertically-movable shaft, a gear-wheel splined upon said shaft, means for driving said gear-wheel, a sliding bracket engaging the stirrer and means for operating the bracket for elevating and lowering the stirrer, substantially as set forth.

8. In a dough-kneader, the combination of a pan, a vertically-movable rotatable stirrer working in the pan, a movable bracket engaging the stirrer, a rock-arm engaging the bracket, a toothed segment connected to said rock-arm, and an operating-screw meshing with the segment, substantially as set forth.

9. In a dough-kneader, the combination of a pan, a kneader or stirrer working therein, a standard having a guiding flange or way, a sliding bracket engaging the stirrer and working on said flange or way, and means for operating said bracket, substantially as set forth.

10. In a dough-kneader, the combination of a pan, suitable means for rotating said pan, a vertically-movable rotatable shaft supported in suitable bearings and adapted to be driven from the pan, means for supporting the shaft out of operative engagement with the pan, a lever adapted to engage the shaft for holding it in engagement with the pan, a vertically-movable rotary stirrer, gearing between said stirrer and the vertically-movable rotary shaft, a sliding bracket engaging the stirrer and adapted to elevate or lower it, means for operating said bracket and suitable arms or levers connecting the bracket to the said shaft-controlling lever, substantially as set forth.

11. In a dough-kneader, the combination of a rotary pan, means for rotating the pan, a frame or support extending above the rotary pan, a rotatable shaft journaled in said frame or support and adapted to be driven from the pan, a vertically-movable rotatable stirrer operating in the pan, a vertically-movable shaft journaled in the frame or support and carrying said stirrer and intermeshing gears splined to the stirrer-shaft and operating-shaft, substantially as set forth.

12. In a dough-kneader, the combination of a rotary pan, a stirrer, a stationary frame or support overhanging the rotary pan, a vertically-movable rotary shaft journaled in the frame or support and adapted to engage and be driven by the pan, means for holding the shaft out of engagement with the pan, gearing between said shaft and the stirrer, and a pivoted controlling-lever mounted in the frame or support and provided with an antifriction-roller or equivalent device bearing on the end of the shaft and adapted to force and hold it into engagement with the pan, substantially as set forth.

13. In a dough-kneader, the combination of a suitable rotating platform or support, a driving-shaft geared directly thereto, a pan removably attached to said platform and adapted to rotate with it, a vertically-sliding rotary stirrer working in said pan, means for elevating the vertically-journaled stirrer from the pan, a standard extending up to one side of the rotating platform and provided with a bearing above the edge of the pan, a horizontal kneader journaled in said bearing and working in the pan, and gearing between the driving-shaft and said kneader and stirrer, substantially as set forth.

LOUIS DURAND.

Witnesses:
HERBERT KNIGHT,
J. GREEN.